Dec. 14, 1971   R. F. KOEN   3,626,721
TORQUE LIMITER
Filed Aug. 29, 1969   3 Sheets-Sheet 1

INVENTOR
Richard F. Koen
BY: _____
ATTORNEY
_____
AGENT

Dec. 14, 1971  R. F. KOEN  3,626,721
TORQUE LIMITER

Filed Aug. 29, 1969  3 Sheets-Sheet 3

INVENTOR
Richard F. Koen

BY _____
ATTORNEY

_____
George L. Brehm
AGENT

United States Patent Office 3,626,721
Patented Dec. 14, 1971

3,626,721
TORQUE LIMITER
Richard F. Koen, 127 Ridgefield Road,
Lutherville, Md. 21093
Filed Aug. 29, 1969, Ser. No. 854,162
Int. Cl. F16d 7/02
U.S. Cl. 64—30                                    1 Claim

ABSTRACT OF THE DISCLOSURE

A torque limiter having a prestressed split collar for gripping a shaft and a power transmitting member attached thereto for receiving power from the shaft or transmitting power thereto, the prestressed collar having an internal liner or bushing surrounding the shaft, the liner having spongy or springy qualities and torque loads over a predetermined amount will cause rotary slippage between the liner and the shaft.

---

This invention relates to torque limiter or overload clutch and more particularly to such a device incorporated in a power transmitting device mounted on a shaft, the power transmitting device taking the form of a gear, pulley, sprocket or the like and in which an overload or torque beyond a predetermined amount will cause slippage between the device and shaft to prevent damage to the particular machine in which the device is used.

Various overload clutches have heretofore been used but many involve complicated mechanisms such as radical flanges between driving and driven members with axial springs pressing the flanges together with a predetermined force. Such devices frequently involve the use of keys to attach the flanges to the shaft and facings or linings on the flanges of friction material and other complicated parts.

Applicant contemplates the use of a simple prestressed split ring which in contracting grips the shaft and which will slip on the shaft on predetermined torque overload. The split ring is provided centrally with a bushing of spongy or springly material such as lubricant impregnated sintered bronze, nylon or materials of similar characteristics which will adequately grip the shaft to transmit the torque required but which will also allow for slippage between itself and the shaft when overload occurs.

It is one object of this invention to provide a torque limiter which is simple in construction and foolproof and reliable in operation.

It is another object to provide such a device which can readily be adjusted to the desired slip torque value while on the shaft and the value will be retained after many slippages.

It is a still further object to provide such a device with self-lubricating and cooling means during clutch slippage.

It is still another object to provide such a device with means which gives visual indication of slippage or which functions to stop the machine when slippage occurs.

These and other objects and advantages will become more apparent as this description proceeds and reference is had to the accompanying drawing forming a part of this specification and in which.

Figures 1, 2:
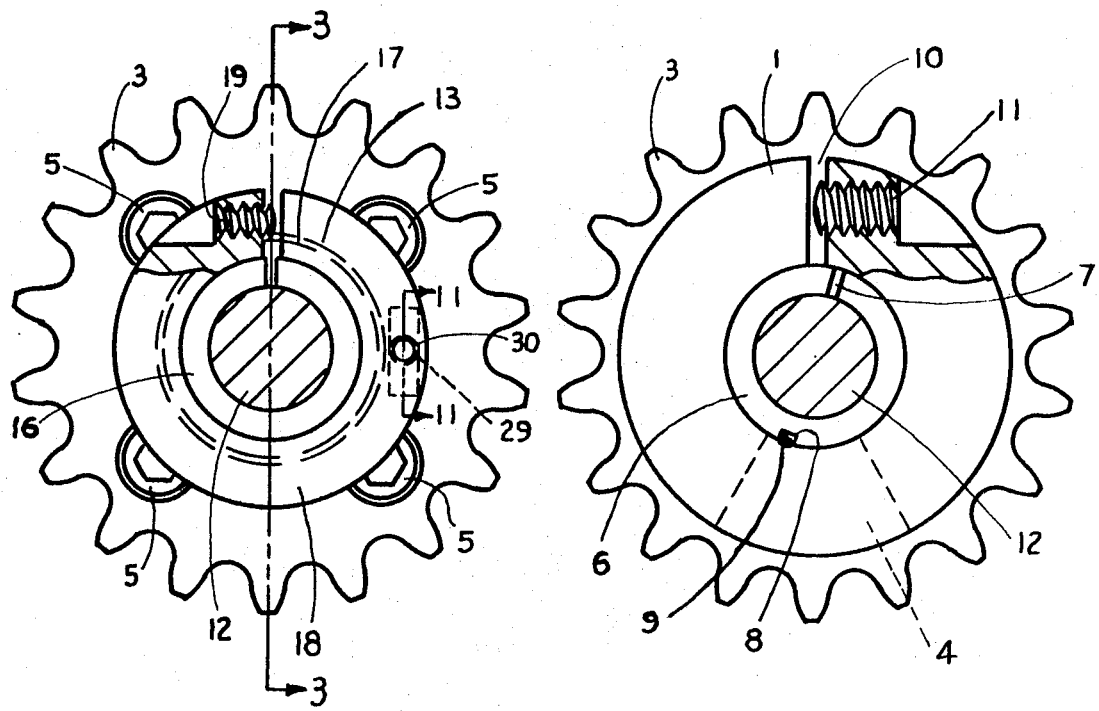
FIG. 1 is an end view of my device with portions broken away to show internal features.
FIG. 2 is a view similar to FIG. 1 showing the opposite end.
Figure 3:
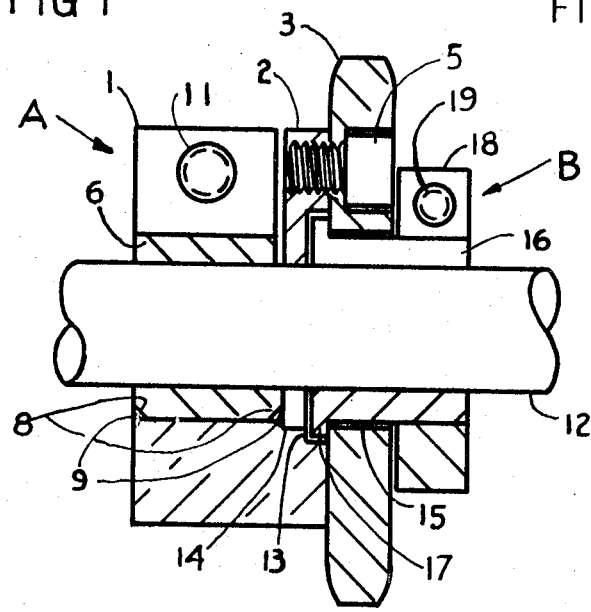
FIG. 3 is a central longitudinal sectional view on line 3—3 of FIG. 1.

Referring now to the drawing in more detail and particularly to FIGS. 1 to 3 thereof, the device comprises an overload clutch or torque limiting portion proper, generally designated A, and the axial movement preventing portion, generally designated B.

The torque limiting portion has a prestressed split ring section 1 and a power take-off section 2 integrally joined thereto in a small segmental area 4 in a region opposite the split in the split ring section. The power take-off section is completely circular. A sprocket 3 or any equivalent drive element is fastened to the power take-off section by means of screws 5 or the like.

The prestressed split ring section 1 and power take-off section 2 are substantially similar in structure and function to the shaft engaging unit of my prior U.S. Pat. No. 3,127,202 of Mar. 31, 1964.

In the instant case, however, the split ring section 1 is provided with a clutch element 6 within its bore to grip the shaft. The clutch element is split at one side at 7 for contractability and is inserted and held in the bore in the split ring section by providing two bevelled portions 8 in the clutch element and then peening, staking or otherwise deforming portions 9 of the split ring into the bevels. The split 7 in the clutch element is rotatively displaced with respect to the split 10 in the split ring section to prevent entrance of dirt to the shaft surface.

The prestressed split ring section is provided with an expansion screw 11 for expanding the section and its contained clutch element in order to place the same on the shaft 12. Thereafter the screw 11 is released all or part way to cause the prestressed split ring section to grip the shaft to the extent desired.

The axial movement preventing portion B is composed of flanged bushing 16 and gripping element or ring 18.

The power take-off element 2 has a counter bored recess 13 and a central opening 14 larger than the shaft 12. The sprocket or other drive element 3 also has an opening 15 larger than the shaft and of a size to receive the body portion of the split flanged bushing 16, while the flange 17 thereof is located in the counterbore 13 of the power take-off element.

A gripping element or ring 18, which is similar in function to the pre-stressed split ring section 1, surrounds the bushing 16 and contracts the same into tight engagement with the shaft. This split ring 18 is provided with an expander screw 19 similar to the screw 11 in element 1. The flanged split ring 16 and gripping element 18 being locked to the shaft will prevent any axial displacement of the torque limiting portion of the device during slippage of the clutch element 6 on the shaft 12.

Figure 4:
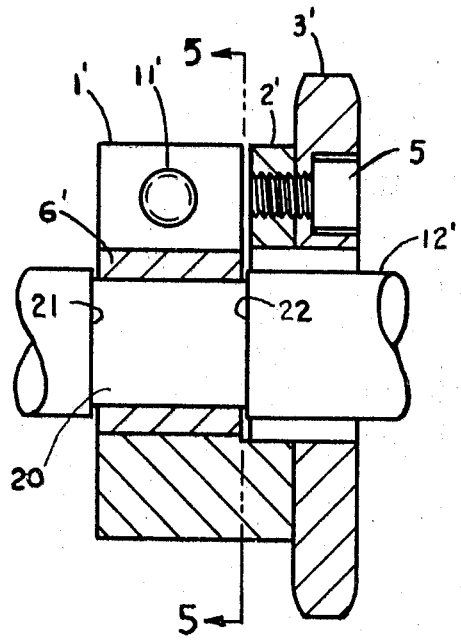
FIG. 4 is a view similar to FIG. 3 of a modified form of the device.
Figure 5:
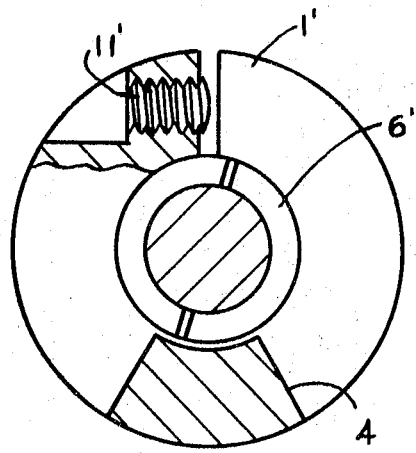
FIG. 5 is a sectional view on line 5—5 of FIG. 4.

FIGS. 4 and 5 show a modified form of torque limiter. In this form the gripping element 1', power take-off element 2' and sprocket or similar drive member 3' are similar to those disclosed in the first form but no clamped on axial movement preventing means is employed. In this form the clutch element 6' is made in two parts which parts are positioned in an annular groove 20 in the shaft 12', the end walls 21 and 22 preventing any endwise movement when the clutch slips. The expansion screw 11' functions exactly as its counterpart 11 in the first form and is not only used in initially assembling the parts of the device but also in adjusting the slip torque value after assembly.

Prestressed ring type gripping elements of the type shown at 1 and 1' in the two forms of the device described above present certain problems not the least of which is the tendency under certain conditions for slippage to occur between the clutch member 6 or 6' and the gripping member rather than between the clutch member and shaft 12 which is undesirable as it results in uneven slippage, undue wear and difficulty in obtaining an accurate setting of slip torque value. Applicant has overcome these problems by using a clutch member of spongy or springy material. Examples of materials having the desired qualities are sintered bronze and certain plastics such as nylon. To illustrate how these materials act in the instant device reference is had to FIGS. 6 to 10 of the drawings.

Figure 6:
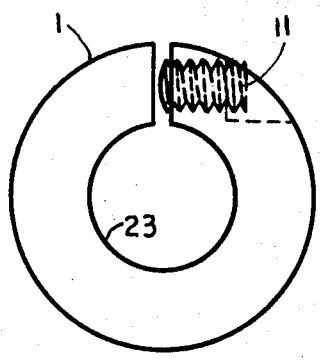
FIG. 6 is a side view of a gripping element prior to springing.
Figure 7:
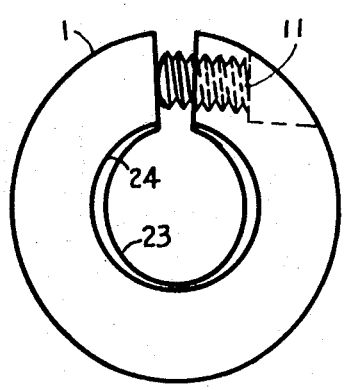
FIG. 7 is a side view of a gripping element after having been sprung open, showing the elliptical shape of the opening and also the finished circular shape after finish boring.
Figure 8:
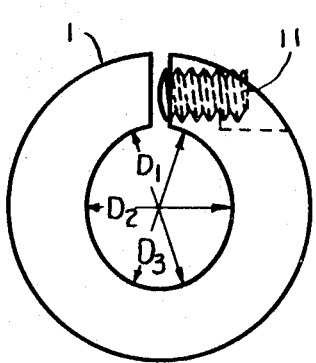
FIG. 8 is a side view of a gripping element after finish boring in unsprung condition showing the oval shape of opening.
Figure 9:
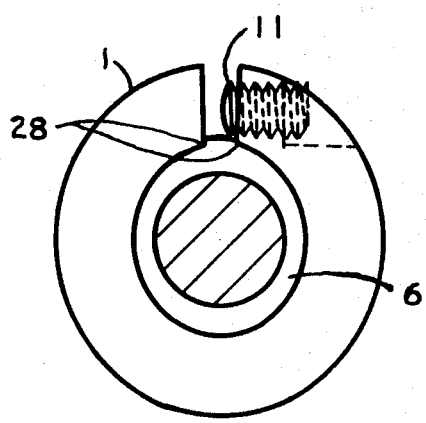
FIG. 9 is a side view of a gripping element with an internal clutch element of yielding material shown locked on a shaft with the outer surface of the yielding clutch element shown with its assumed outer oval shape.
Figure 10:
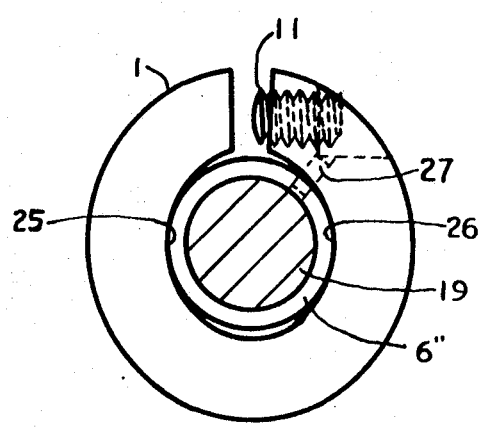
FIG. 10 is a side view of a gripping element with an internal clutch element of non-yielding material and locked against rotation relative to the gripping element by a radial locking pin.

FIG. 6 shows the split ring member 1 in relaxed condition, its central opening 23 being of true circular shape. When this ring is expanded by screw 11 the circular inner bore 23 becomes oval or somewhat elliptical in shape as shown somewhat exaggerated at 23 in FIG. 7. The ring bore is then rebored to true circular shape as shown at 24 in FIG. 7. If then the expansion screw 11 is fully unscrewed as shown in FIG. 8 the central bore will again assume an oval shape with diameters D1 and D3 greater than diameter D2. It can thus be readily seen that a clutch member of hard material inserted in the bore as shown at 6" in FIG. 10 will contact the bore only at points 25 and 26 thereof and afford very little surface contact between the gripping member and clutch member to give sufficient friction to prevent slippage between the gripping member and clutch member. Even using pins such as 27 does not prove entirely satisfactory as even they have failed in use on occasion. It has been found that spongy materials such as sintered bronze or certain plastics such as nylon when used as the clutch member will assume the oval shape of the gripping member while their inner bores will assume the true circular shape of the shaft as shown in FIG. 9. In fact, it will deform slightly into the split of the gripping member as shown at 28 and all slippage between the gripping member and clutch member is prevented. In addition, if sintered lubricant impregnated bronze is used for the clutch member it is self lubricating and cooling when slippage occurs on the shaft. Also the spongy and or springy materials mentioned are somewhat self-adjusting after repeated slippages and the slip torque value of a particular setting of the screw 11 will be retained for long periods before resetting is necessary.

Figure 11:
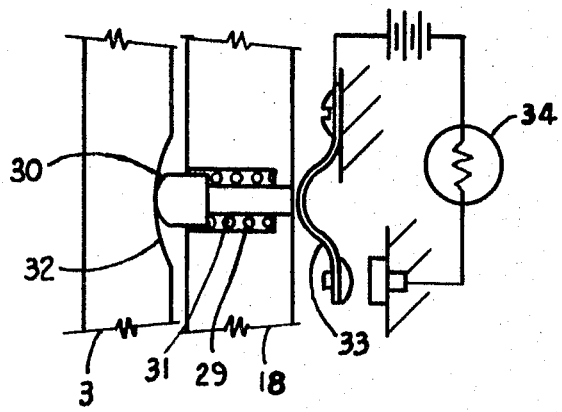
FIGS. 11 and 11A are fragmentary enlarged sectional views substantially on line 11—11 of FIG. 1 showing a trip pin arrangement and a diagrammatic showing of a switch which may be used therewith to indicate slippage of the clutch element on the shaft, in both pre-set position and in slipped position respectively.
Figure 11A:
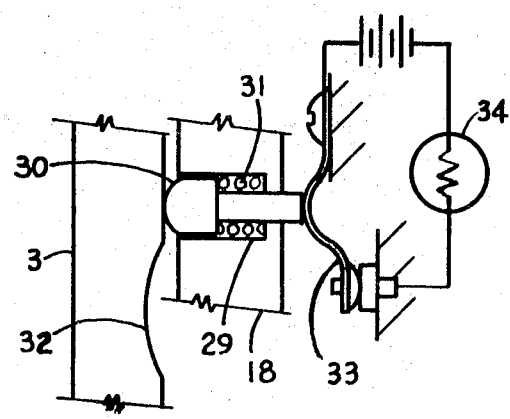

FIGS. 11 and 11A, which are fragmentary sectional views taken substantially on line 11—11 of FIG. 1 show one means to provide a signal in the event slippage occurs in the torque limiting device. The clamping ring 18 is provided with a countersunk bore 29 and a round head pin 30 slidably mounted in said bore and urged outwardly in the direction of the element 3 by the spring 31. The element 3 is provided with a milled recess 32 having inclined camming walls and the elements 3 and 18 are normally positioned that the headed pin rests at the lowermost portion of the milled recess as shown in FIG. 11. When in this position, the end of the pin opposite the head will be substantially flush with the outer side surface of element 18. When slippage occurs between elements 3 and 18 the parts will assume the position shown in FIG. 11A and the pin 30 will ride out of the milled recess and be moved against the pressure of the spring 31 to force its end portion outwardly beyond the side surface of the element 18. This projecting pin may then be used to close switch shown diagrammatically at 33 and activate a signal light 34. Or, if desired, the switch may be used to break the circuit controlling the power of the machine in which the device is a part to stop the same. The spring pressed pin 30 and recess 32 also form convenient indexing means to reset the device after slippage if desired.

Having described several preferred embodiments of my invention what I desire to secure by Letters Patent is:

1. A torque limiter mountable on a circular surface of a drive element, the combination comprising:
   (a) a slippable pre-stressed gripping element in the form of a split ring of highly resistant expansion and contraction qualities, having an opening therethrough surrounding the driving element;
   (b) means for expanding and releasing said split ring gripping element in out-of-round position against its pre-stressed position;
   (c) a split bushing of substantial thickness positioned between the inner surface of the pre-stressed split ring and the circular surface of the drive element and of such inside diameter as to be slidably engageable with the outer circular surface of the driving element when the pre-stressed gripping element is in extended position;
   (d) said bushing being of sintered bronze and of such elasticity as to conform to both the inner surface of the pre-stressed gripping element and the outer surface of the circular drive element when the ring expanding means has been operated to allow the said pre-stressed ring to return to a position where it applies pressure to the bushing, thereby pressing the bushing in contact with any slight out-of-round surface in both the gripping element and the drive element;
   (e) said pre-stressed gripping element being of such size and force as to deform the said bushing to contact substantially the full inner surface of the pre-stressed ring and the outer surface of the circular driving element;
   (f) a power take-off element slidably receivable over the driving element and means for fixedly securing the power take-off to the pre-stressed split ring in a confined area substantially equal distance from the end surface of the split ring;
   (g) a non-slidable element fixed to said drive element;
   (h) a cam operated signal carried by one of the elements and a cooperating cam carried by the other of the said elements for operating said signal upon slight relative movement of the two elements.

References Cited

UNITED STATES PATENTS

| | | | |
|---|---|---|---|
| 3,111,824 | 10/1963 | Firth | 64—30 |
| 3,425,528 | 2/1969 | Perruca | 64—30 |
| 3,473,202 | 10/1969 | Howard | 287—52 |

BENJAMIN W. WYCHE, Primary Examiner

R. HEALD, Assistant Examiner